(12) United States Patent
Wing

(10) Patent No.: US 8,296,975 B2
(45) Date of Patent: Oct. 30, 2012

(54) SNOW CHUTE

(76) Inventor: Alex J. Wing, Morris, NY (US)

( * ) Notice: Subject to any disclaimer, the term of this patent is extended or adjusted under 35 U.S.C. 154(b) by 163 days.

(21) Appl. No.: 12/928,304

(22) Filed: Dec. 7, 2010

(65) Prior Publication Data

US 2011/0167681 A1   Jul. 14, 2011

Related U.S. Application Data

(60) Provisional application No. 61/294,273, filed on Jan. 12, 2010.

(51) Int. Cl.
*E01H 5/02* (2006.01)

(52) U.S. Cl. .......................................................... 37/197

(58) Field of Classification Search .................... 37/197, 37/270, 264, 265, 285, 196, 195, 466; 294/54.5; 52/24, 25, 26, 23
See application file for complete search history.

(56) References Cited

U.S. PATENT DOCUMENTS

| | | | | | |
|---|---|---|---|---|---|
| 2,891,330 | A | * | 6/1959 | Murphy | 37/285 |
| 2,950,547 | A | * | 8/1960 | Murphy | 37/237 |
| 3,998,486 | A | * | 12/1976 | Mittelstadt | 37/285 |
| 4,729,199 | A | * | 3/1988 | Oller | 52/173.1 |
| 5,083,388 | A | * | 1/1992 | Cooley | 37/268 |
| 5,570,524 | A | * | 11/1996 | Groat | 37/285 |

* cited by examiner

*Primary Examiner* — Robert Pezzuto

(57) ABSTRACT

An apparatus for removing snow from the surface of a pitched roof that is a substantially rectangular, flat, flexible sheet with a snow grasping surface and a snow sliding surface, said sheet being conformable to the shape of the snow.

2 Claims, 4 Drawing Sheets

SNOW CHUTE

CROSS-REFERENCE TO RELATED APPLICATION

This application claims priority from U.S. Provisional Application Ser. No. 61/294,273, filed Jan. 12, 2010, the disclosure of which is incorporated herein by reference.

FIELD OF THE INVENTION

This invention relates to snow removal apparatuses and, more particularly, to a roof snow removal apparatus for assisting a user to remove accumulated snow from a roof.

BACKGROUND OF THE INVENTION

Snow has accumulated on roofs for generations. The build-up of snow on roofs can cause serious problems if melting occurs, creating ice dams causing water to back up under shingles and leak through the roof into the house or other building. Also, if the weight of the snow becomes too heavy for the roof to support, caving in of the roof from the weight of snow and water accumulated on the roof can result in dumping snow and water into the house or like building. Thus, not only must the roof itself be repaired, but anything in the interior of the house or like building that acquired water damage must be replaced or repaired. Additionally, this is often a problem that can occur annually. The common practice is to remove the snow, with a shovel, while standing on the roof. One solution to snow build-up is to remove snow off the roofs of houses and like buildings. A common method of snow removal is shoveling which creates a risk of slipping and falling and places undue strain on the back of the person shoveling. Additionally, shovels can only remove a certain amount of snow at a time causing the person shoveling to be subjected to the cold for a longer time than is necessary. Also, shoveling can only remove a small portion of snow at a time and may need to be moved numerous times. Other methods such as raking the snow off roofs can cause the snow to fall on top of the person trying to remove the snow and limits the ability to reach the highest or middle part of the roof if the handle is too short. Unless the person using prior rakes climbed onto the roof, which makes accidents more likely, the amount of snow that would get removed would be minimal. Additionally, rakes could pull shingles from the roof or otherwise damage them when the rake is dragged across them. Accordingly, a need remains for a roof snow removal apparatus in order to overcome the above-noted shortcomings. The present invention satisfies such a need by providing a snow removal apparatus that is easy and convenient to use, lightweight and compact in design, and improves the user's safety. Homeowners, business owners and professional contractors find this apparatus quite helpful, in that it permits an individual to remove roof snow much easier.

SUMMARY OF THE INVENTION

In view of the foregoing background, it is therefore an object of the present invention to provide a roof snow removal apparatus. These and other objects, features, and advantages of the invention are provided by a snow removal apparatus for assisting a user to remove accumulated snow from a roof.

In one embodiment, the invention comprises an apparatus for removing snow from an elevated surface (roof) comprising a flexible vinyl sheet with a grasping surfaced backing. The user forms a trench through the snow covering the roof. The snow itself is the only material needed for the trench. The trench can be either made perpendicular to the roof edge or at an angle so as to avoid dropping snow onto certain areas. The vinyl sheet is then laid in the trench and is held in place with the grasping backing. This forms a snow chute onto which the user shovels snow. The snow is then deposited off the roof and to the ground by means of gravity.

The use of the sheet/chute approach enables easier removal of snow on higher areas of the roof that cannot be reached by conventional snow rakes. It also allows for quicker and safer snow removal especially on larger roofs. The sheets can also be overlaid to allow for construction of a longer chute or to change the angle of the flow of snow.

Accordingly objects and advantages of various illustrative embodiments of the invention include:
1. To provide a device to reduce the effort required to remove the snow load from the roof.
2. To provide a device to work in any depth, or consistency, of snow load.
3. To provide a device that requires little or no maintenance or moving parts.
4. To provide a device that can be easily installed and operated.
5. To provide a device that can be easily stored.
6. To provide a device that provides a less straining method of operation.

Other objectives and advantages may become apparent from consideration of ensuing description and drawings.

There has thus been outlined, rather broadly, the more important features of the invention in order that the detailed description thereof that follows may be better understood, and in order that the present contribution to the art may be better appreciated.

There are additional features of the invention that will be described hereinafter and which will form the subject matter of the claims appended hereto.

DETAILED DESCRIPTION OF THE INVENTION

Figure 1:
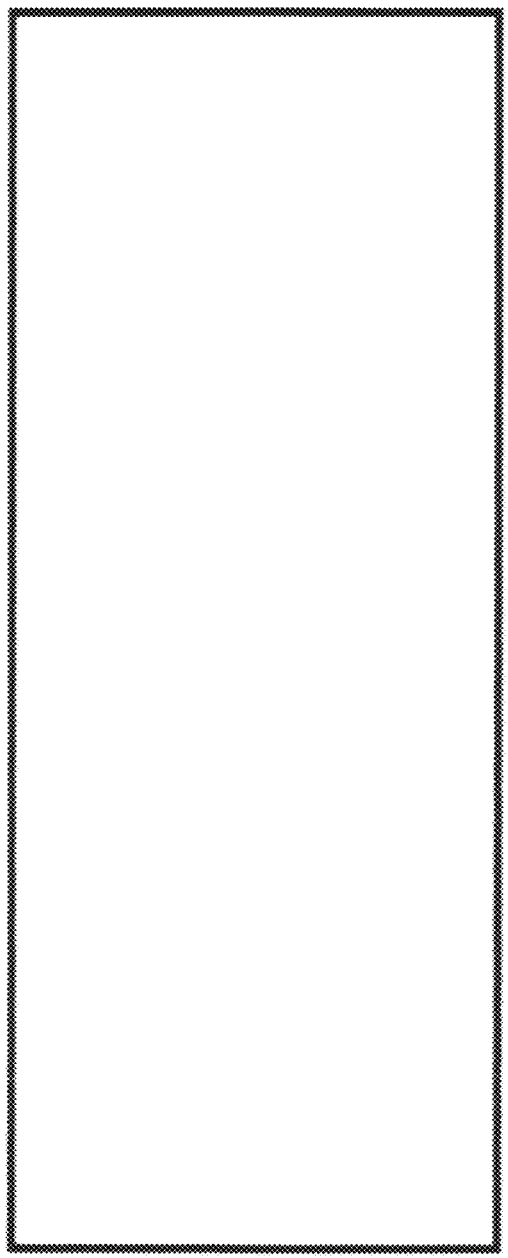
FIG. 1 is a front view of an illustrative embodiment of a roof snow removal apparatus in accordance with the present invention.

The specification that follows provides detailed descriptions of various illustrative embodiments of the invention.

In one such illustrative embodiment, the invention comprises an apparatus for removing snow from a pitched surface comprising a substantially rectangular, flat, flexible sheet, said sheet comprising a snow grasping surface and a snow sliding surface, wherein said sheet, when laid on top of a blanket of snow on the pitched surface with the snow grasping surface down, is conformable to the shape of the snow.

The flat flexible sheet can be made of any durable flexible material that allows snow to slide down the sheet when it is positioned on a pitched roof. Generally, snow placed on the snow sliding surface of the sheet will slide by the force of gravity alone, although depending, e.g., upon the pitch of the roof and the wetness and weight of the snow, a minor amount of additional force may be required, such as the amount of force a person would apply with a light push of a shovel. Generally, it will be unnecessary to employ a rake or other device to force the snow down and off of the roof in most situations.

The flexible sheet can be prepared, e.g., by extrusion, molding, or weaving of various non-permanently deformable polymers or co-polymers of, e.g., acrylics, polyesters, silicones, or polyurethanes. Useful polymers or co-polymers include, e.g., cellulosic polymers, polyethylenes, polyamides, vinyls such as but not limited to polyvinyl chlorides, and polytetrafluoroethylenes. The sheet may contain other components commonly used in plastics, e.g., plasticizers and slip additives. The sheet can be made of other materials, e.g., foils or wovens. The sheet preferably either is or is coated with a material that is substantially water impermeable such that the snow sliding surface is substantially impermeable to snow that melts on the surface thereof. The sheet does not become brittle at low temperatures such as would be observed on a snow covered rooftop. One suitable material, among others, is a polyvinyl chloride-coated polyester, typically 18 to 22 oz weight, such as is supplied by Top Value Fabrics, located in Carmel, Ind.

Depending upon the choice of materials, the sheet can be unilamellar, in which case snow grasping means will be attached to one side of the sheet to form the snow grasping surface. Alternatively, the sheet can be multilamellar, e.g., it can comprise a first sheet that serves as the snow sliding surface and a second sheet that comprises the snow grasping surface.

The snow sliding surface can also comprise a snow sliding enhancing substance such as, e.g., a wax spread on all or a portion of the snow sliding surface.

In illustrative unilamellar embodiments of the invention, snow grasping devices, such as soft or coarse patches or stripes, which are substantially flat and flexible, are adhered to the snow grasping surface of the sheet. Coarse devices can be, e.g., hooks such as would be found on a hook and loop fastener, a felt, a brush-like surface, or another type of rough or ribbed surface, e.g., a fish scale, cross-hatched or ridged surface such as might be found on the underside of waxless Nordic skis, or teeth or cleats such as might be found on snow or ice cleats. By "substantially flat," it is meant that the thickness of each snow grasping device (or of the entire snow grasping layer, in the case of a snow grasping device that is a second layer), is not more than about 5-fold the thickness of the snow sliding layer or, in other embodiments, no more than about 2-fold or even 1-fold the thickness of the snow sliding layer.

Any suitable pattern of such snow grasping devices can be used. See, e.g., FIGS. 2 and 3. For example, a coarse material can be adhered to the snow grasping surface as a plurality of strips that are parallel to the length of the apparatus, that are perpendicular to the length of the apparatus or that are diagonal to the length and width of the apparatus, or to a combination of any two or more such patterns. The snow grasping surface can comprise pieces of carpet, e.g., exterior needlepoint carpet, or rubber matting, such as is used for rubber floor coverings or animal stall mats. The entire snow grasping surface can comprise a layer of such carpet adhered or otherwise affixed, e.g., by sewing, to the underside of the snow sliding surface.

In illustrative multilamellar sheets of the invention, a second layer is made of a material that is the snow grasping device, e.g., a carpet that comprises a second layer adhered or otherwise affixed to the snow sliding surface, or that comprises discrete snow grasping devices, e.g., as described, above, and that is adhered directly or indirectly to the layer that comprises the snow sliding surface.

Whether unilamellar or bilamellar or other multilamellar, the apparatus of the invention is applied to the surface of a snow-covered pitched roof. The snow grasping surface is placed on the snow and the snow grasping devices eliminate the need for ropes or pins or anchors to secure the device. The flexibility of the device allows it to be formed in a trench in the snow to form a u-shape or v-shape furrow without a need for molds, forms or other structural support. The apparatus is typically but not necessarily elongate, e.g., rectangular or ovular, such that the length is longer than the width, e.g., twice the width or longer, and can measure any convenient size, e.g., two to 6 feet wide and four to sixteen feet long. In the case of an apparatus that is longer than it is wide, the long axis is placed more or less perpendicular to the roof, e.g., between approximately 45 degrees to approximately 90 degrees relative to the roofline. It can be placed such that an end of the device is near to or overhangs the bottom of the roof. It can be directed into a snow collection apparatus such as a truckbed or other container.

Figure 4:
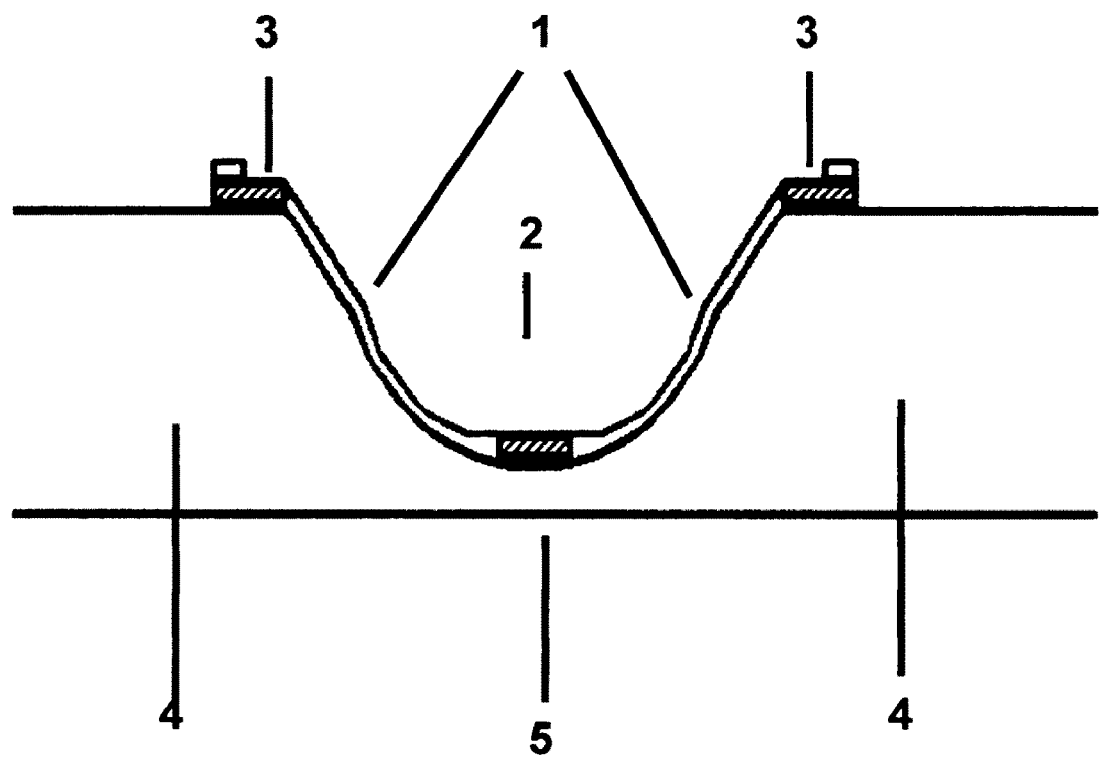
FIG. 4 is a cross-sectional view a roof snow removal apparatus of the invention showing the apparatus inserted into the trough of the roof snow.

A furrow is typically made down the center of the sheet so as to guide sliding snow, e.g., as illustrated in FIG. 4. The furrow can be made prior to laying down the apparatus or afterwards by pressing or stepping down on the apparatus and thereby crushing the snow under the apparatus.

It is not necessary to employ a frame or other structural support member because the apparatus of the invention is supported by the snow. The apparatus is maintained in place by the friction or grasping of the snow grasping devices on the snow grasping surface. The apparatus also does not require a paddle, blade or other snow moving device.

Other illustrative devices of the invention comprise enhancements, e.g., (1) handles for ease of carrying, (2) fasteners for connecting two or more apparatuses of the invention to form a larger working surface, (3) grommets for mechanically anchoring the apparatus to the snow, etc.

Figure 2:
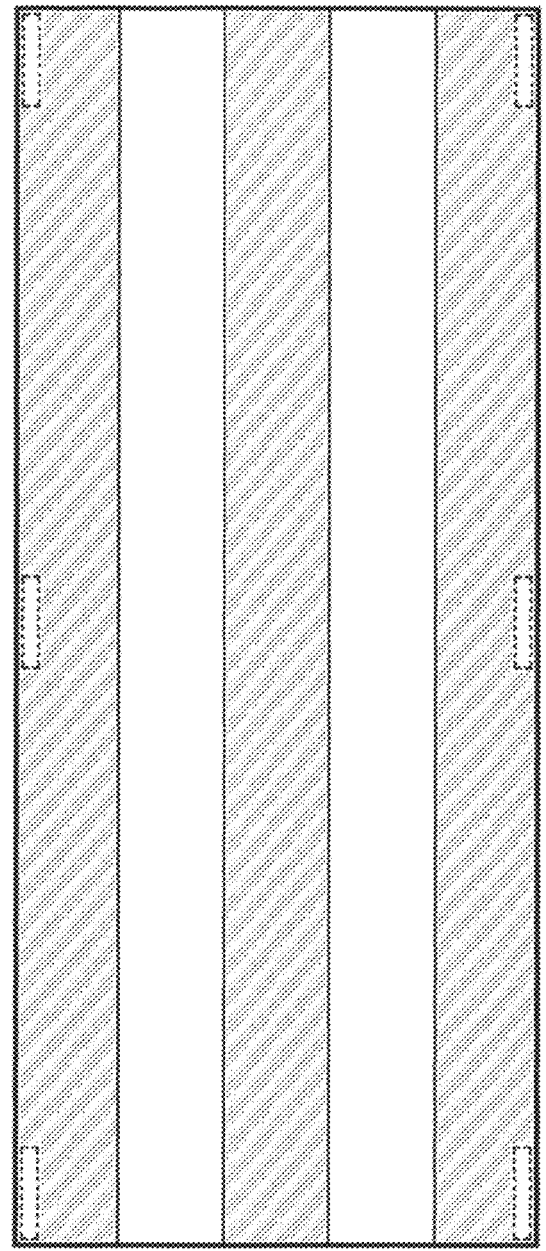
FIG. 2 is a rear view of an illustrative embodiment of a roof snow removal apparatus of the invention showing snow grasping devices, in the form of backing strips parallel to the length of the device, attached to the vinyl sheet.
Figure 3:
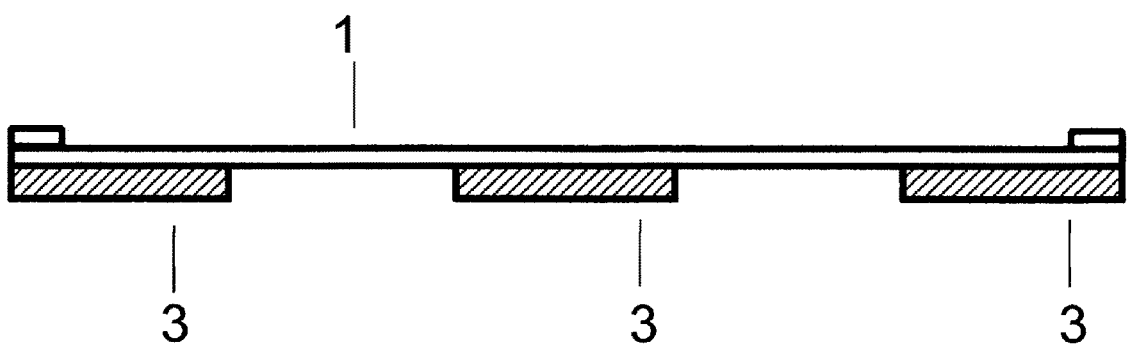
FIG. 3 is a side/cross-sectional view of the apparatus shown in FIGS. 1 and 2, showing the positioning of the grasping backing strips on the vinyl sheet.
Figure 5:
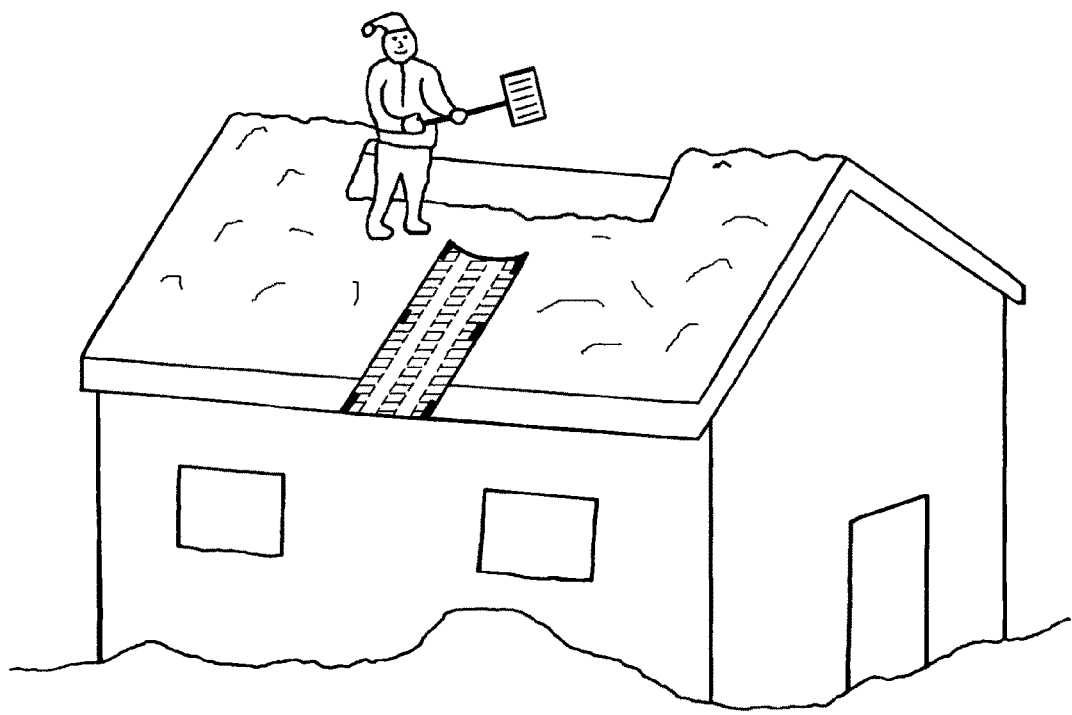
FIG. 5 is a view of the apparatus in place on a roof.

With reference to the figures, FIG. 1 is a front view of an illustrative embodiment of a roof snow removal apparatus in accordance with the present invention. It shows the snow sliding surface of a plain apparatus of the invention. FIG. 2 is a rear view of an illustrative embodiment of a roof snow removal apparatus of the invention showing snow grasping devices, in the form of three backing strips parallel to the length of the device, attached to the snow grasping side of the vinyl sheet. The small clear rectangles represent handles in the form of slits, or openings, with sewn edges (not shown in FIG. 1). FIG. 3 is a cross-sectional view of the apparatus shown in FIGS. 1 and 2, showing the positioning of the snow grasping devices (3) on the vinyl sheet (1). FIG. 4 is a cross-sectional view of the apparatus shown in FIGS. 1, 2 and 3 installed on a rooftop (5), showing the vinyl sheet (1) shaped to create a furrow (2) in the snow with the snow grasping devices (3) holding the apparatus in place. FIG. 5 is a view of the apparatus in place on a roof with a person shoveling snow onto the apparatus.

The method of the invention comprises a) laying onto the surface of the snow a substantially rectangular, flat, flexible sheet, said sheet comprising a snow sliding surface and a snow grasping surface, i.e., the apparatus as described above, such that the snow grasping surface is in contact with the snow on the roof and that an edge of the sheet overhangs or is proximate to the edge of the roof and b) moving, e.g., by shoveling, snow from exposed portions of the roof onto the snow sliding surface of the sheet whereby the snow slides down and off of the roof One illustrative embodiment of the method of the invention comprises depressing the sheet so as to form a furrow that is angled, e.g., about 30 to 90 degrees, relative to the edge of the roof prior to moving snow onto the snow sliding surface of the sheet. In other illustrative embodiments, multiple apparatuses of the invention are used together with overlapping edges, e.g., to increase the length of the combined apparatuses for use on longer rooftops.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

The invention claimed is:

1. A method for removing snow from the surface of a pitched roof that comprises:
   a) laying onto the surface of the snow a substantially rectangular, flat, flexible sheet, said sheet comprising a snow sliding surface and a snow grasping surface, such that the snow grasping surface is in contact with the snow on the roof and that an edge of the sheet overhangs or is proximate to the edge of the roof,
   said apparatus being held in place after being laid on top of a blanket of snow by the snow grasping surface and
   said apparatus not having a frame or other structural support member or a paddle, blade or other snow moving device;
   b) moving snow from exposed portions of the roof onto the snow sliding surface of the sheet whereby the snow slides down and off of the roof.

2. The method of claim 1 that comprises depressing the sheet so as to form a furrow angled relative to the edge of the roof prior to moving snow onto the snow sliding surface of the sheet.

* * * * *